United States Patent

[11] 3,601,019

| [72] | Inventor | Kiyoshi Kitai<br>13-13, 2-chome, Takasago, Katsushika-ku,<br>Tokyo, Japan |
|---|---|---|
| [21] | Appl. No. | 860,517 |
| [22] | Filed | Sept. 24, 1969 |
| [45] | Patented | Aug. 24, 1971 |
| [32] | Priority | Sept. 24, 1968 |
| [33] | | Japan |
| [31] | | 43/68528 |

[54] CAMERA MECHANISM FOR AUTOMATIC EXPOSURE BY AMBIENT OR FLASH ILLUMINATION
4 Claims, 4 Drawing Figs.

[52] U.S. Cl. .................................................. 95/10 C,
    95/11 R, 95/11.5 R, 95/53 R
[51] Int. Cl. .................................................... G03b 9/00,
    G03b 17/18, G01j 1/44
[50] Field of Search ........................................... 95/10 C,
    11, 11.5, 53, 53 E

[56] References Cited
UNITED STATES PATENTS

| 3,220,326 | 11/1965 | Scudder | 95/10 C |
| 3,374,718 | 3/1968 | Hochreiter | 95/10 C |
| 3,426,661 | 2/1969 | Wick et al. | 95/10 C |
| 3,433,138 | 3/1969 | Burgarella | 95/10 C |
| 3,504,602 | 4/1970 | Kiper et al. | 95/11.5 X |
| 3,504,604 | 4/1970 | Kitai | 95/53 |

*Primary Examiner*—Samuel S. Matthews
*Assistant Examiner*—Joseph F. Peters, Jr.
*Attorneys*—Robert E. Burns and Emmanuel J. Lobato

ABSTRACT: Camera shutter control device having a photoresponsive element detecting brightness of a field of exposure and control elements responsive thereto for programming or setting the camera for automatic control of flash and flashless exposures as a function of the brightness detected. The control device sets the camera for flashless exposures if the brightness is above a predetermined value and for flash exposures if the brightness is below this level. A lock automatically locks the control device to preclude taking of an exposure by flash photography, even if the brightness calls for use of a flash, in the event that the camera flash unit is not operative for whatever reason. A manual release will release this lock so that flashless exposures can be taken as timed exposures.

CAMERA MECHANISM FOR AUTOMATIC EXPOSURE BY AMBIENT OR FLASH ILLUMINATION

This invention relates generally to cameras and shutters and more particularly to automatic exposure control device with manual override.

A known camera is provided with a brightness detector which senses the brightness of the field and objects therein being photographed. Provision is made in these cameras for responding to the detection of the brightness and automatically controlling the exposure in dependence upon the brightness sensed. Control apparatus will control taking of an exposure with use of a flash or without depending upon the level of the brightness detected. If the brightness is over a predetermined level the camera is automatically readied for a flashless exposure and if the brightness is below this level an automatic change over is made and the camera is readied for a flash exposure. These known cameras operating as described above have a serious defect in that if the flash unit is inoperative for any reason and the camera is automatically set for taking a flash exposure a poor exposure will be taken.

A principal object of the device according to the invention is to provide for automatically taking flashless and flash exposures as a function of the brightness of the field and objects therein being photographed and providing for manually overriding the device so that flashless photographs can be taken if the flash unit is inoperative.

According to the invention a shutter control mechanism is provided having a photoresponsive device sensing the brightness of the field of the exposure to be taken. The device will automatically set a camera for taking a flashless exposure if the brightness detected is above a predetermined level and will set the shutter control mechanism for taking a flash exposure if the brightness is below the desired level. A changeover means will change the setting for either type of exposure automatically. A manual release is provided for allowing the taking of timed exposures by overriding the automatic flash exposure-setting elements in the event that the flash unit is inoperative. The shutter release lever can then be operated manually. The device of the invention automatically prevents operation of the shutter release lever if the flash unit is inoperative and the manual override will release locking mechanism preventing release of the shutter release lever so that the mentioned timed exposure can be taken.

Other features and advantages of the device according to the present invention will be better understood as described in the following specification and appended claims, in conjunction with the drawing in which:

Figure 1:
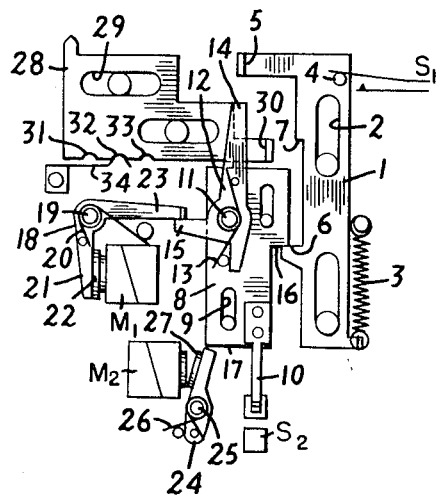
FIG. 1, is a diagrammatic side elevation view of a device according to the invention and illustrates a condition in which the brightness detected is below a given value and the shutter release mechanism for flash photography is locked.

The construction of the device of the invention will be herein described with reference to the drawings. A shutter release lever 1 is supported and movable up and down on a camera, not shown, under the guidance of a pair of slots 2, and a pin on the camera disposed in each slot. The shutter release lever is biased to a raised position by a spring 3 and is operable to move downwardly against the spring force to activate or open a shutter, not shown. A pin 4 projects from a side surface of the release lever 1 and opens an electric source switch $S_1$ in the raised position of the lever and closes it when beginning its downward motion. The release lever has an arm 5 on one side, at the upper part thereof and an operating protrusion or projection 6 at the lower part and a stop step 7 intermediate the protrusion and the arm.

Figure 2:
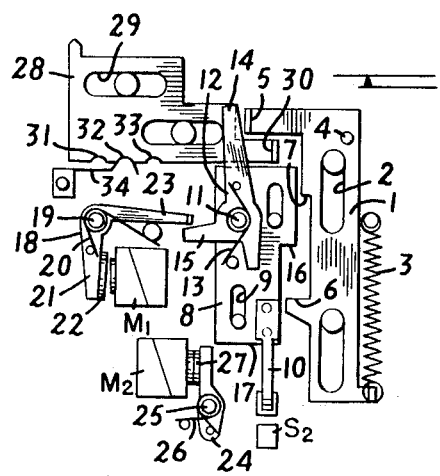
FIG. 2, is a diagrammatic side elevation view of the device in FIG. 1 and illustrates a condition in which the device is in condition for taking of a flashless exposure.

A changeover plate 8 is movable up and down guided by two slots 9 and a guide pin in each slot fixed to the camera. At the lower end thereof is mounted a sliding contact piece 10 that projects from the plate and opens and closes the contact of a switch $S_2$. A pivot 11 is fixed to the changeover plate pivotally mounting a lever-shaped part 12 so it is rotatable freely in a clockwise direction as shown in FIG. 1 and in FIG. 2. The lever 12 is biased in a clockwise direction by a spring 13. A movable arm 14 of the lever 12 is positioned within the path of downward movement of the arm 5 of the shutter release lever 1 when the lever 12 has been rotated to the position illustrated after clockwise rotation. Another arm 15 of the lever 12 is disposed for engaging an operating arm 23 of a release lever 18.

The release lever 18 is pivotally mounted by a pivot 19 and is biased in a clockwise direction by a spring 20. The operating arm 23, as mentioned above, is dimensioned so as to engage with the arm 15 of the lever 12. The lever 18 has another arm 21 located opposite to an electromagnet $M_1$. When the electromagnet $M_1$ is excited an armature 22 is activated engaging the lower arm 21 of the release lever 18 so that it is rotated counterclockwise against the force of the spring 20.

A locking electromagnet $M_2$ is mounted separately on the camera. A lock lever 24 is pivotally mounted by a pivot 25, and is biased in a clockwise direction by a spring 26. An armature iron piece 27 is mounted on the lock lever 24. When the electromagnet $M_2$ for locking is deenergized, the lock lever 24 is rotated in a clockwise direction and is within the path of downward movement of lower edge 17 of the changeover plate 8. When the locking electromagnet is energized the armature piece 27 is attracted and the lock lever is rotated to the position illustrated in FIG. 2.

A manual release lever 28, that constitutes a manually operated releasing lever, is supported so as to be movable to the right and to the left in the figure guided by slots 29 within each of which is a guide pin fixed to the camera. An operating projection 30 is formed at an end of the release lever 28. The release lever 28 can be moved to three operating positions so that the end projection 30 is movable back and forth to the right and left to three operating positions described below. A holding spring element 34, having one end free and the other fixed, is provided with a projection engageable with three notches 31, 32, 33 on a side edge of the release lever for setting the three operating positions of the release lever and therefore, its end operating projection 30.

When the elastic spring 34 cooperates with the first notch 31 the operating projection engages the notch or stop 7 so the shutter release lever cannot move downwardly. When the spring engages the second notch 32 the manual release lever 28 is in the position shown in FIG. 1 so the operating projection 30 cooperates neither with the shutter release lever 1 nor with the two arm lever 12. The operating projection 30 of the manually operated release lever 28 has a side extension as shown in the drawing so that when the manual release lever is moved manually completely to the left the side extension of the operating end 30 of the release lever engages the upper arm 14 of the two-arm lever 12 and rotates it in a counterclockwise direction against the action of the biasing spring 13. Since the manual release lever is releasably held by the resilient holding spring 34 in its set operating positions the upper arm 14 of the two-arm lever 12 is kept from rotating into the path of movement of the upper arm 5 of the shutter release lever 1 when the third notch 33 is engaging with the holding spring 34.

Figure 3:
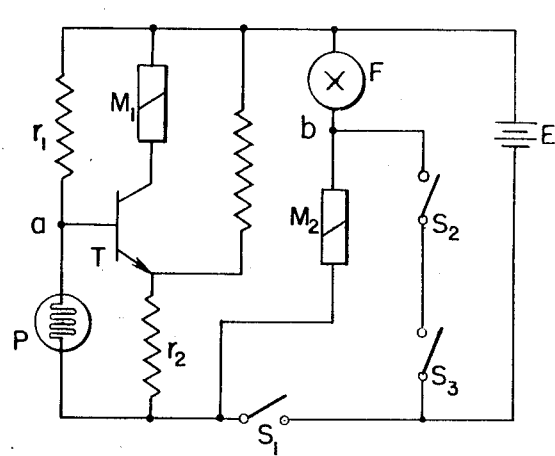
FIG. 3, is a diagram of a circuit of the device of FIGS. 1 and 2.

FIG. 3 shows an operating circuit of the above-mentioned embodiment, in which a photoelectric element P and a comparative resistor $r_1$ are connected in series to an electric source E. The electric source E voltage is divided corresponding to the resistance R of the photoelectric element, the voltage at a connecting point $a$ thereof connected to the base of a transistor T and the releasing electromagnet $M_1$ and an operating resistor $r_2$ through the collector and the emitter circuits of a transistor T. In parallel to these are connected a flash bulb unit F and the electromagnet $M_2$ for locking both of which are connected in series. A switch circuit is connected at point b with a switch $S_2$ and a synchro-switch $S_3$ of the shutter in series. This circuit is parallel with the electromagnet $M_2$. The switch $S_1$ opened and closed by the shutter release lever 1 is connected as shown.

The operation of the device of this invention constructed as described above is as follows: When a camera provided with the invention is directed to a field or scene to be photographed electric voltage source E has its voltage divided by the resistance $r_1$ and the resistance R of the photoelectric element P corresponding to the scene brightness and the latter voltage is applied to the base of the transistor T. If the scene brightness is higher than a predetermined level and daylight or flashless photography is possible, the transistor T becomes nonconductive. The electromagnet $M_1$ for releasing is demagnetized. The releasing lever 18 is rotated clockwise by the spring 20. The operating lever 23 thereof engages with the arm 15 of the intermediate lever 12 to make this rotate counterclockwise, so that the moved arm 14 is outside the downward path of the upper arm 5 of the shutter release lever 1 to enable pushing down the shutter release lever freely, and even if the shutter release lever moves downwardly the changeover plate 8 retains its position as it is, thereby the switch $S_2$ is not closed. Therefore, since the locking electromagnet $M_2$ is in series with the flash bulb F irrespective of the setting condition of the flashlight unit, the flash bulb is not ignited and daylight or flashless photography is allowed to be performed.

When the scene brightness of the object being photographed is lower than the predetermined level, the base voltage of the transistor T exceeds the definite predetermined value. The transistor T becomes conductive and the release electromagnet $M_1$ is excited to attract the armature 22 so that the release lever 18 rotates counterclockwise against the force of the spring 20, thereby the intermediate or two-arm lever 12 that cooperates with the operating arm 23 thereof rotates clockwise. The projecting arm 5 of the shutter release lever 1 engages with the moved arm 14 of the intermediate lever 12 in the beginning of the downward movement of the release lever 1. The changeover plate 8 moves downwardly through the intermediate lever 12. The contact 10 thereof closes the switch $S_2$, so that, if the flashlight unit F has been set properly, the circuit containing the flashlight unit F, the switch $S_2$ and the synchro-switch $S_3$ is closed synchronously with the release of the shutter. The flashlight unit F bulb flashes and emits light to allow flash photography to be performed. And when the downward movement of the release lever 1 ceases the shutter release lever 1 is raised upwardly by the biasing spring 3. At the same time, the operating projection 6 engages with the notch 16 of the changeover plate 8 to make the changeover plate 8 move upwardly to its original position. As described above, the changeover between daylight or flashless photography and flashbulb photography becomes possible according to the brightness of the field being photographed.

When the changeover to flash photography takes place corresponding to the scene brightness, if the flash unit F has not been set properly due to the absence of a flash bulb in the flash unit or the breakdown of the flash bulb, electric current does not flow through the locking electromagnet $M_2$ and this is not excited, so that the lock lever 24 is rotated clockwise by the force of the spring 26. The downward movement of the changeover plate 8 is impeded due to the engagement of its lower edge 17 with the lock lever 24, thereby the downward movement of the shutter release lever 1 is prevented through the intermediate or two-arm lever 12.

When the device of this invention is used in a camera provision is made for taking exposures that would normally require flash photography but such an exposure cannot be made, for example because no flash bulb is available. For such cases the release lock is made so that it is releasable manually. For such operation the manually operated releasing lever 28 is pulled out, to the left, from the position illustrated in FIGS. 1 and 2. The notch 33 is engaged with the elastic stop 34. The operating projection 30 of the manual release lever 28 engages with the arm 14 of the intermediate lever 12 and rotates this arm counterclockwise against the force of the spring 13 to enable the shutter release lever 1 to move downwardly when manually pushed enabling the taking of daylight or flashless photographs with a timed exposure. And, if the manual release lever 28 is in the position when the second step notch 32 engages with the elastic stop spring 34, the operating projection 30 does not act on the intermediate lever 12 nor on the shutter release lever 1. But if the manual release lever 28 is pushed to the position where the first step notch 31 engages with the stop spring 34 the operating projection 30 engages with the step part 7 of the shutter release lever 1 and impedes the downward movement of the shutter release lever 1. This locks the shutter release lever irrespective of the scene brightness and prevents the operation of the shutter release lever at times other than when taking a photograph.

Moreover, it is possible to construct the device of the invention in such a way that, instead of the manual release lever 28 engaging with and disengaging from the intermediate lever 12, the engagement and disengagement of the manual release lever 28 are effected on the release lever 18 which can be manually actuated independently of the release electromagnet $M_1$.

Figure 4:
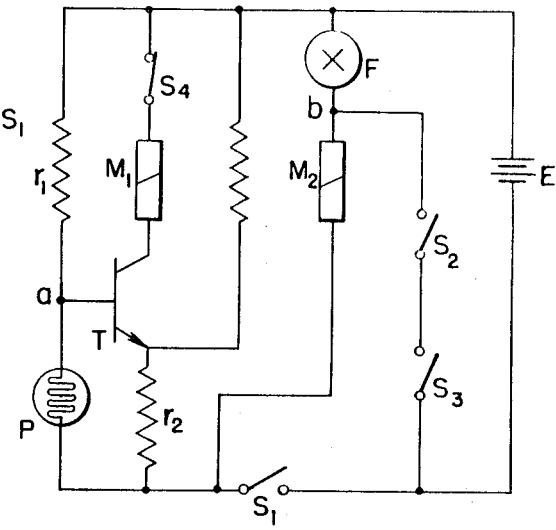
FIG. 4, is a diagram of a second embodiment of a circuit of the device of FIGS. 1 and 2.

In the latter embodiment described above, the manual release lever 28 performs its function by actuating the release lever 18 or the intermediate lever 12 mechanically, but in the embodiment shown in FIG. 4, the manual release lever 28 is actuated electrically, namely the manual release part consists of a manually opened and closed switch $S_4$. The circuit shown in FIG. 4 is the same as that shown in FIG. 3 except for the manually operated switch $S_4$. Thus the circuit elements in FIG. 4 have the same designations as the corresponding elements in FIG. 3 in order to make it easier to compare the two circuits. The switch $S_4$ is connected in series with the release electromagnet $M_1$ in the collector circuit of the scene brightness detecting transistor T. Therefore, by opening the manually opened and closed switch $S_4$, the release electromagnet $M_1$ is not excited irrespective of the scene or field brightness. The operating arm 23 of the release lever 18 makes the intermediate lever 12 always rotate counterclockwise, and the moved arm 14 thereof is made to move outside the downward path of the projecting arm 5 to permit the downward movement of the shutter release under manual control. When the manually opened and closed switch $S_4$ is closed, the changeover between the daylight or flashless photography and flash photography is performed similarly as in the embodiment of FIG. 3.

As described above, the present invention enables carrying out the following procedure: The scene brightness is detected so as to make it possible to changeover between daylight or flash photography automatically, and when changed over to flash photography, the release locking takes place automatically if the flash unit is not set properly, and moreover, in the event that the changeover to the flash photography has been effected, a photographer who knows this fact is enabled to take daylight photographs by releasing the release lock manually. Thus the scope of use of a camera can be extended according to the object of photographing in the case of an experienced photographer, and moreover, even an unskilled photographer is able to take photographs confidently whether the scene or field brightness is high or low.

WHAT I CLAIM AND DESIRE TO SECURE BY LETTERS PATENT IS:

1. In a camera, a brightness-sensing device for automatically taking flashless exposures when the brightness of a field of exposure and objects therein are above a given value and for automatically taking flash exposures when said brightness is below said given value comprising light-responsive means to sense the brightness of a field of exposure and objects therein being photographed, means responsive to said brightness-sensing means controlling the taking of an exposure as a flashless exposure when the brightness sensed is above a given value and means controlling the taking of a flash exposure when said brightness is below said given value, changeover means cooperative with the two last-mentioned means for changing from a mode of operation for taking of flashless exposure to a mode for taking flash exposures, a flash unit in said device for taking flash exposures, lock means automatically locking said device to preclude taking of flash exposures when said flash unit is unable to effect a flash, and manual means to render said lock means ineffective selectively to enable taking of flashless exposure.

2. In a camera according to claim 1, in which said lock means effectively locks said changeover means in a condition in which flash exposures cannot be taken.

3. In a camera according to claim 1, in which said manual means is operable to a plurality of positions, one of said positions is a position in which said manual means has no effect on said lock means.

4. In a camera according to claim 1, in which said brightness-sensing device includes a circuit in which said flash unit and said manual means are connected.